United States Patent [19]
Adams

[11] Patent Number: 5,909,362
[45] Date of Patent: Jun. 1, 1999

[54] RESONANT POWER CONVERTER

[75] Inventor: Mark Adams, Arlington, Wash.

[73] Assignee: ELDEC Corporation, Lynwood, Wash.

[21] Appl. No.: 09/005,950

[22] Filed: Jan. 12, 1998

[51] Int. Cl.[6] .................................................. H02M 3/335
[52] U.S. Cl. ............................................... 363/21; 363/97
[58] Field of Search ............................... 363/21, 16, 20, 363/97

[56] References Cited

U.S. PATENT DOCUMENTS

| | | |
|---|---|---|
| 4,073,003 | 2/1978 | Chambers ................................ 363/21 |
| 4,415,959 | 11/1983 | Vinciarelli . |
| 4,695,934 | 9/1987 | Steigerwald et al. . |
| 4,727,469 | 2/1988 | Kammiller . |
| 4,774,649 | 9/1988 | Archer . |
| 4,791,542 | 12/1988 | Piaskowski . |
| 4,796,173 | 1/1989 | Steigerwald . |
| 4,823,249 | 4/1989 | Garcia . |
| 4,825,348 | 4/1989 | Steigerwald et al. . |
| 4,855,888 | 8/1989 | Henze et al. . |
| 4,891,746 | 1/1990 | Bowman et al. . |
| 5,010,471 | 4/1991 | Klaassens et al. . |
| 5,038,264 | 8/1991 | Steigerwald . |
| 5,051,880 | 9/1991 | Harm et al. . |
| 5,073,849 | 12/1991 | Morris . |
| 5,075,836 | 12/1991 | Suzuki et al. . |
| 5,177,675 | 1/1993 | Archer . |
| 5,179,511 | 1/1993 | Troyk et al. . |
| 5,267,138 | 11/1993 | Shores . |
| 5,388,040 | 2/1995 | Hall . |
| 5,414,238 | 5/1995 | Steigerwald et al. . |
| 5,485,362 | 1/1996 | Archer . |
| 5,559,688 | 9/1996 | Pringle . |

OTHER PUBLICATIONS

Belaguli et al., "Analysis and Design of Hybrid Parallel Series Resonant Converter," 27th Annual IEEE Power Electronics Specialists Conference, vol. 1, pp. 259–265, 1996. Abstract Only.

Suryawanshi et al., "Modified LCLC–Type Series Resonant Converter With Improved Performance," IEE Proc., Electr. Power Appl. (UK), 143(5), pp. 354–360, Sep. 1996. Abstract Only.

Raju et al., "A 3 Element LCL Resonant Converter for Airborne Radar Applications," Proceedings of the 1996 International Conference on Power Electronics, Drives and Energy Systems for Industrial Growth vol. 1, pp. 168–175, 1995. Abstract Only.

Belaguli et al., "Characteristics of Hybrid Resonant Converter Operating on the Utility Line," Tenth Annual Applied Power Electronics Conference and Exposition, Conference Proceedings 1995, vol. 2, pp. 1006–1012, 1995. Abstract Only.

(List continued on next page.)

*Primary Examiner*—Shawn Riley
*Attorney, Agent, or Firm*—Christensen O'Connor Johnson & Kindness PLLC

[57] ABSTRACT

A resonant power converter holds energy within the circuit for a variable period to provide fixed-frequency, zero-voltage switching power conversion. A first switch alternately connects and disconnects a DC voltage source to one side of the primary winding of the transformer of a power converter. A second switch is connected between the other side of the primary winding and ground. A switch controller is responsive to the difference between a reference voltage and the voltage level present at the output of the circuit associated with the secondary winding of the transformer. Energy is added to the circuit while the first and second switches are closed. The first switch is then opened and energy is held in the circuit for a variable period of time to delay the beginning of resonance. Finally, both switches are opened and the energy within the circuit resonates. The energy holding period is adjusted as necessary to maintain a fixed frequency with varying loads. Accordingly, the switch controller is configured to open and close the first and second switches to maintain fixed-frequency operation of the power converter and switching of the second switch under zero-voltage conditions and in the presence of varying loads.

20 Claims, 2 Drawing Sheets

OTHER PUBLICATIONS

Jacobson et al., "Fixed Frequency Resonant Converter for High Voltage High Density Applications," 24th Annual IEEE Power Electronics Specialists Conference, pp. 357–363, 1993. Abstract Only.

Kim et al., "Auxiliary Resonant–Pole Assisted ZVS Transition PWM DC–DC Power Converter Transformer–Parasitic LC Resonant Tank for Medical–Use X–Ray Tube Drive and Its Feasible Evaluation," Proceedings of 1994 Symposium on Power Electronics Circuits, pp. 71–74, 1994. Abstract Only.

Bhat, A.K.S., "A Fixed Frequency LCL–Type Series Resonant Converter," IEEE Trans. Aerosp. Electron. Syst. (USA), 31(1), pp. 125–137, Jan. 1995. Abstract Only.

Ojo et al., "Dynamic Analysis of LLCC Parallel Resonant Converter Under Pulse–Width Modulation Control," *Archiv fur Elekktrotechnik*, 77(2), pp. 135–141, Jan. 1994. Abstract Only.

Bonnet et al., "A New Regulation Concept for Resonant Converter," Official Proceedings of the Twentysecond International Power Conversion (PCIM) Conference, pp. 429–438, 1991. Abstract Only.

Kim et al., "Feasible Developments of Resonant–Pole Assisted Soft–Switching Transition PWM DC–DC Power Converter Using Transformer Parasitic Resonant Components," Fifth International Conference on 'Power Electronics and Variable–Speed Drives', (Conf. Pub. No. 399), pp. 673–678, 1994. Abstract Only.

Jain et al., "Modeling and Analysis of Fixed Frequency Phase–Shift Modulated Tertiary–Sided Parallel–Tuned Resonant DC–DC Converter," Conference Record of the 1993 IEEE Industry Applications Conference Twenty–Eighth IAS Annual Meeting, vol. 2, pp. 1081–1089, 1993. Abstract Only.

Bhat, A.K.S., "Analysis and Design of a Fixed Frequency LCL–Type Series Resonant Converter," Seventh Annual Applied Power Electronics Conference and Exposition, Conference Proceedings 1992, pp. 253–260, 1992. Abstract Only.

Simon et al., "Dielectric Relaxation in a Ferroelectric Ceramic with the Composition," *Journal of the Physics and Chemistry of Solids*, 52(9), pp. 1165–1167, 1991. Abstract Only.

RESONANT POWER CONVERTER

FIELD OF THE INVENTION

This invention relates to DC-to-DC power converters, and more particularly, to resonant, zero-voltage switching (ZVS) power converters.

BACKGROUND OF THE INVENTION

There are a variety of DC-to-DC power converters available for transforming an input DC voltage of one magnitude to an output DC voltage of another magnitude. In general, switching power converters function by operating an active switch to alternately connect and disconnect a source voltage to a load. In order to deliver continuous power to the load, the power converter must store energy for use during periods in which the switch is open and the voltage source is disconnected. The amount of energy that must be delivered to the load by the energy storage device, and therefore the amount of energy that must be stored in the energy storage device, is related to the switching frequency. Consequently, by increasing the operating frequency of the power converter, the energy storage capacity is reduced. Similarly, the size and weight of the power converter may be reduced by increasing the switching frequency.

There are at least two primary types of power converter topologies. In a "flyback" converter, a voltage source is connected through a switch in series with the input winding of a transformer. By alternately opening and closing the switch, a pulse is produced in the secondary winding of the transformer, which is connected through a diode to an output capacitor. Because the switching rate and the rates of change in the current in both the primary and secondary windings are very high, electromagnetic and radio frequency interferences are produced in the circuit. Filters must be used to attenuate this interference, increasing the complexity and cost of the system, and diminishing its efficiency.

In a "forward" converter, an inductor is typically added after the secondary winding of the transformer, to reduce the absolute current magnitude in the secondary circuit. A second diode is also included in the secondary circuit to close the circuit between the output capacitor and the inductor when the input switch is opened. As with the flyback converter, electromagnetic and radio frequency interferences are produced in the forward converter, which requires filters to attenuate. For both the flyback and forward converters, simultaneous occurrence of a voltage across and a current through the switch occurs, resulting in a dissipation of energy. The net result is an overall reduction in efficiency and reliability due to the higher component operating temperature.

More recently, many of the limitations found in the forward and flyback converters have been addressed by improvements found in the "resonant" power converter. In the resonant power converter, the converter is tuned or components are added to the power converter to establish an effective LC circuit that defines the time scale for the rise and fall of energy through the windings of the transformer. By taking advantage of this energy rise and fall, or resonance, one or more switches in the switching power converter can be switched open and closed at zero current through the switch, zero voltage across the switch, or both. By switching at either zero-voltage or zero-current switching losses that result from the dissipation of energy during the simultaneous occurrence of a voltage across and current through the switch are reduced. At the same time, much of the noise produced by the switches can be eliminated.

Although resonant power converters generally have less switching loss than previous typologies, they still suffer to a larger degree to electromagnetic and radio interference produced in the circuit. Consequently, even resonant designs typically include input filters to attenuate these interferences.

In addition, as with previous power converters, the performance of resonant power converters generally suffers due to influences such as drift, input line or load impedance variations, or other external factors. Such influences, particularly including changes in the input line or load impedance, typically cause corresponding changes in the resonant frequency of the power converter. Because of this frequency variation, the power converter filters must be designed in a manner to filter noise across a wider frequency range. This design constraint adds expense and complexity to the design. Further, many applications simply cannot tolerate such frequency variations. For example, when the frequency of a power converter associated with a cathode ray tube (CRT) is asynchronous with the raster scan rate of the CRT, the resulting noise may produce visual effects, such as hum bars, on the CRT screen. In addition, this frequency variation may cause an otherwise resonant power converter to switch at times when there is voltage across, or current through the switch, causing additional noise and inefficiencies.

Although some power converter designs are intended to operate resonant at a fixed frequency, they are only able to maintain resonance over a fairly narrow range of input line or load impedance variations, which depending on the application, could become a performance limitation.

SUMMARY OF THE INVENTION

The present invention provides a DC-to-DC power converter that is able to operate at a fixed frequency while maintaining resonant zero-voltage switching while also operating over a range of input line and load impedance variations. The power converter includes an input voltage source, first and second switches, a system for controlling the switches, an inductive element such as a transformer having primary and secondary windings, and a high voltage multiplier-rectifier. The input voltage source provides a DC signal that is alternately connected and disconnected with the closing and opening of the first switch to energize the circuit. After start-up, energy flows from the input voltage source through the first switch to the transformer while the first and second switches are closed. The current flowing through the primary winding of the transformer ramps up until the first switch is opened while the second switch remains closed. At this point, the voltage across the primary winding of the transformer resonates to zero, where it is held clamped, while the current continues to flow through the primary winding. During this period, energy is "held" in the circuit.

After the energy across the primary winding of the transformer has resonated to zero and energy is held for an appropriate time duration, the second switch is opened. During the time in which the second switch is open, some of the energy is transferred to and stored within other circuit components, including capacitors, the second switch, and the circuit associated with the secondary winding of the transformer. Accordingly, the energy in the circuit will resonate, having a resonant frequency that is related to the transformer inductance, transformer winding capacitance, and the impedances of other circuit components. Once the voltage in the circuit has resonated to a level that will allow zero-voltage switching, both switches are again closed to trigger the beginning of another cycle.

In accordance with other aspects of this invention, the relative times during which the switches are opened and closed are adjusted in response to a changing input line or load impedance or other external influences. Each frequency cycle is divided into three periods: on, hold, and resonant. During the "on" period, energy is added to the circuit while the first and second switches are closed. During the "hold" period, energy is held in the circuit while the first switch is open and the second switch is closed. Finally, during the "resonant" period, the first and second switches are both open while energy resonates throughout the circuit to enable zero-voltage switching. By varying the relative durations for the on, hold, and resonant time periods, while leaving the sum of the on, hold, and resonant time periods constant, the frequency of the power converter remains fixed despite changing input line or load impedances.

In accordance with other aspects of the invention, the energy hold time is minimized in order to minimize losses and maximize efficiency. In one alternate embodiment, the energy hold time approaches zero so that the hold period functions as a "reset" to allow zero-voltage switching.

In accordance with further aspects of this invention, one or more input filters is provided. Because the power converter of the present invention operates at a fixed frequency, the input filters are narrowly designed for the single operating frequency of the power converter.

In accordance with still other aspects of this invention, a synchronization clock input is provided to synchronize the frequency of the power converter with the frequency of an external device or clock.

In accordance with still further aspects of this invention, feedback circuitry and switch control circuitry are provided to ensure that the first and second switches are opened and closed at the proper times to provide a fixed frequency power converter.

In accordance with yet other aspects of this invention, a high voltage multiplier-rectifier is provided in the portion of the circuit associated with the secondary winding of the transformer. The high voltage multiplier-rectifier multiplies the voltage level present at the secondary winding of the transformer and rectifies the high frequency waveform into a DC voltage waveform.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
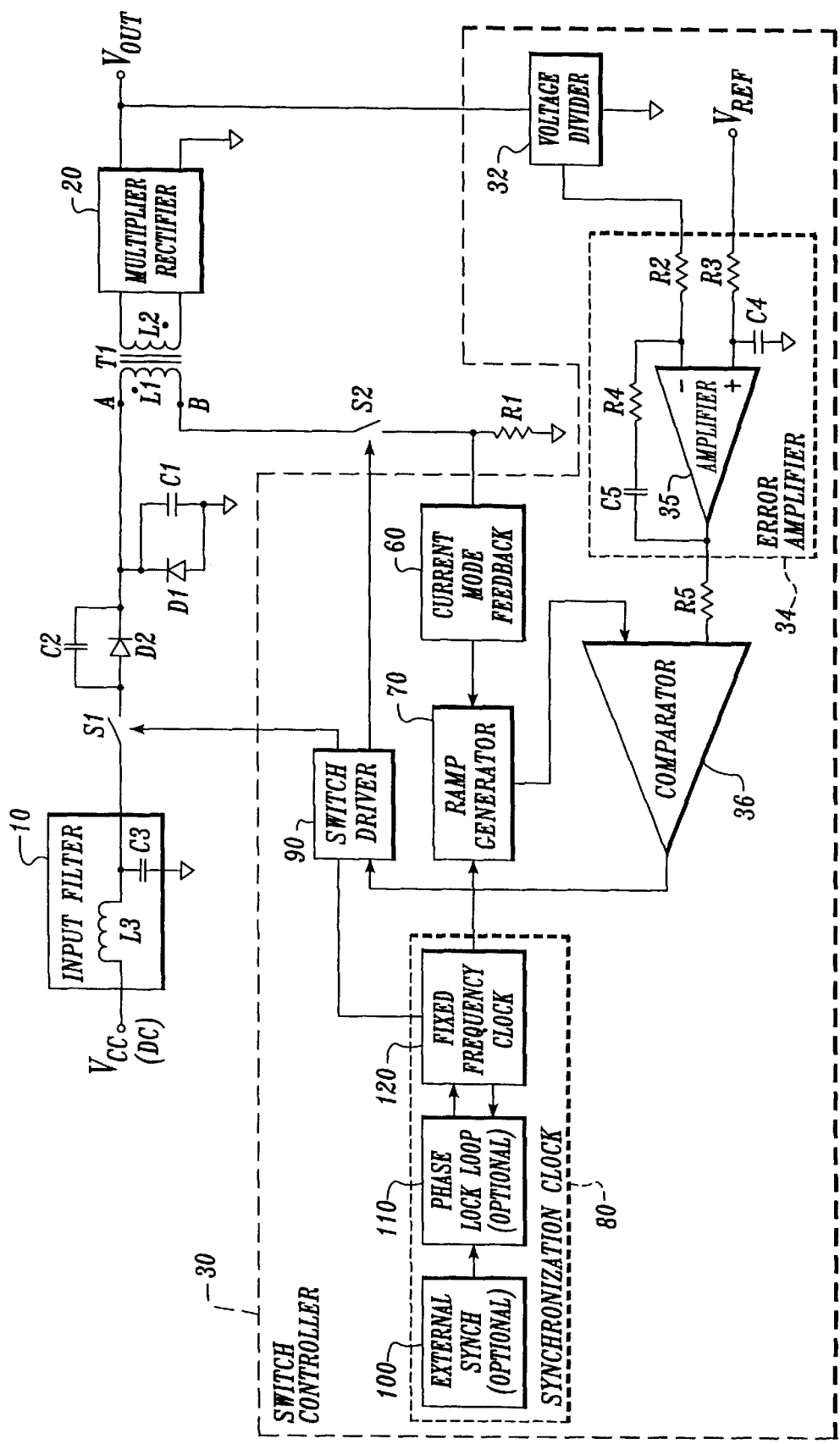
FIG. 1 is a block diagram of a power converter in accordance with this invention.

In the power converter in accordance with this invention shown in FIG. 1, an input DC power source is applied at an input labeled $V_{cc}$. The power converter multiplies the relatively low input DC voltage to provide a relatively higher DC output voltage at an output labeled $V_{OUT}$. In an actual embodiment of this invention, an input voltage of 270 volts DC was converted to an output voltage of 20 kilovolts DC. Those skilled in the art will recognize that other input voltages may be used, and other output voltages may be obtained. Similarly, although a DC input voltage source is depicted in FIG. 1, the power converter of the present invention may include any other means for obtaining a voltage source, such as rectifier circuitry at the input to enable it to operate on an AC input voltage source.

The power converter illustrated in FIG. 1 includes a first switch S1 connected in series between a voltage source $V_{cc}$ and the high or "floating" side (indicated at point A) of the primary winding L1 of a transformer T1, and a second switch S2 connected in series between the low side (point B) of the primary winding L1 and ground. An output from circuitry associated with the secondary winding L2 of the transformer T1 is fed back to a switch controller 30 to control the opening and closing of the first and second switches S1, S2.

As will be better understood from the following description, energy from the input voltage source $V_{cc}$ is provided to the circuit during the period in which the first and second switches S1, S2 are closed. By controlling the operation of the first switch S1 and the second switch S2 via the switch controller 30, the power converter of the present invention accomplishes fixed-frequency, zero-voltage switching operation. The voltage present at the secondary winding L2 of the transformer T1 is multiplied and rectified by a high voltage multiplier-rectifier 20 so that a high voltage DC waveform is present at the output $V_{OUT}$. The output voltage present at the output $V_{OUT}$ is fed back to the switch controller 30 to operate the first and second switches S1, S2.

Figure 2A:
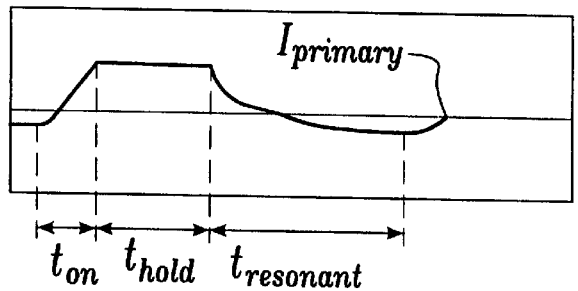
FIG. 2A is a graph of the current flowing through the primary winding of the transformer between points A and B of the block diagram of FIG. 1.
Figure 2B:
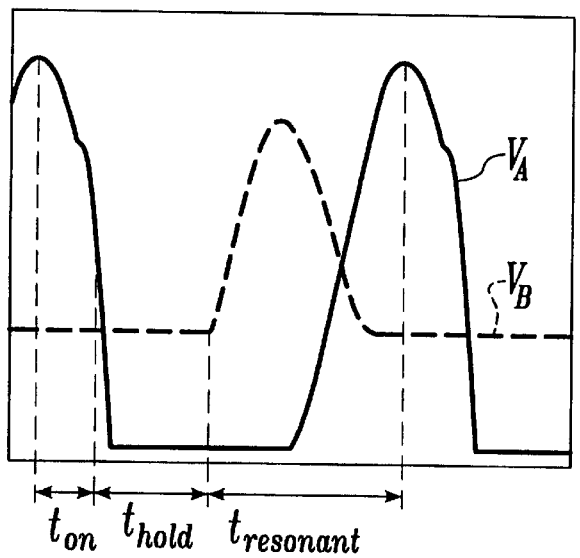
FIG. 2B is a graph of the voltages present at points A and B of the block diagram of FIG. 1, with no load present at the output.

Still referring to FIG. 1, the operation of the preferred embodiment of the power converter of the present invention begins with the first switch S1 and the second switch S2 closed. While the first switch S1 is closed, energy from the voltage source $V_{cc}$ is added to the circuit. With reference to FIGS. 2A and 2B, the time during which both switches S1, S2 are closed is designated "$t_{on}$." During the period $t_{on}$, the current flowing through the primary winding L1 ramps up to a peak. The curve in FIG. 2A represents the current flowing through the primary winding L1 of the transformer T1. The curve designated VA in FIG. 2B corresponds to the voltage present at point A in the circuit of FIG. 1, while the curve designated VB corresponds to the voltage present at point B in the circuit of FIG. 1. The curve for $V_B$ is shown shifted above the curve for $V_A$ for clarity. In actuality, the bottom, flat portion of each curve is equal to 0 volts. Further, there is no voltage scale shown for the curves for $V_A$ and $V_B$. Those skilled in the art will recognize that the curves are not to scale, and further that the scale for the curve for $V_A$ may differ from that for $V_B$.

After the initial period, $t_{on}$, in which energy is added to the circuit, the first switch S1 is opened while the second switch S2 remains closed. At this point, no additional energy is added to the primary winding L1 of the transformer T1 from the input voltage source $V_{cc}$. As shown in FIG. 2A, the primary winding L1 acts as a current memory device such that the current flowing through the primary winding L1 remains generally fixed after the first switch S1 is opened. Accordingly, energy is "held" in the transformer T1. At the same time, the voltage at point A in FIG. 1 will fall to near zero. After the voltage at point A, or the "floating" side of the primary winding L1 of the transformer T1, is reduced to zero, it is held clamped by the parallel combination of a first capacitor C1 and a first diode D1 (FIG. 1) connected to ground between the first switch S1 and the primary winding L1 of the transformer T1. This second time period, during which the first switch S1 is open, the second switch S2 is closed, and energy is "held" in the transformer T1, is designated "$t_{hold}$" in FIGS. 2A and 2B. During $t_{hold}$, energy is held in the circuit to delay the beginning of the resonance within the circuit.

Finally, the first and second switches S1, S2 are opened during the time period designated "$t_{resonant}$" in FIGS. 2A and 2B. As is well known in the art, the energy stored in the circuit will resonate throughout the circuit because of the inductive and capacitive elements contained within it. The resonant frequency will be a function of the transformer inductance and the line, load, and other circuit element impedances. Accordingly, when the second switch S2 is opened, current is still flowing through the primary winding L1 of the transformer T1. This energy is transferred to the circuit associated with the secondary winding L2 and also to the second switch S2, which has an associated parasitic capacitance. Consequently, as illustrated in FIGS. 2A and 2B, the current flowing through the primary winding L1 falls while the voltage $V_B$ across the second switch S2 begins to rise after the second switch S2 is opened. As the voltage rises on the second switch S2, energy is stored in parasitic capacitances associated with the circuit elements. Once the voltage $V_B$ at the second switch S2 reaches a peak such that it is greater than the voltage $V_A$ present at the floating side of the primary winding L1, the current flow will change direction. Accordingly, the voltage present at the floating side of the primary winding L1, illustrated in FIG. 2B as $V_A$, begins to rise, while the voltage $V_B$ at the secondary switch begins to fall.

At this point, current flows back through the primary winding L1 toward the first switch S1. Some of the energy flows into the first capacitor C1. Additional energy charges a second capacitor C2 connected in parallel with a second diode D2 between the primary winding L1 and the first switch S1. The second diode D2 serves to prevent energy from flowing back to the voltage source $V_{cc}$.

The charging of the second capacitor C2 helps to accomplish zero-voltage switching of the first switch S1. To accomplish zero-voltage switching, the voltage present at both sides of the first switch S1 must be the same. The voltage present at the side of the first switch S1 connected to the second capacitor C2 is generally equal to the voltage across the second capacitor C2 plus the voltage at point A on the primary winding L1. Accordingly, once the second capacitor C2 has charged such that the voltage on either side of the first switch S1 is equal to the input voltage $V_{cc}$, the first switch S1 is closed to begin a new clock cycle with zero-voltage switching.

The second switch S2 is closed contemporaneously with the closing of the first switch S1 to begin a new cycle. As illustrated in FIG. 2B, during the time period $t_{resonant}$, the voltage $V_B$ across the second switch S2 resonates to a peak and back to zero where it is held clamped by a body diode (not shown) of the second switch S2 while the voltage $V_A$ at point A is increasing and the second capacitor C2 is charging. The second switch S2 may be closed again at any time after the voltage across the second switch S2 has resonated back to zero to accomplish zero-voltage switching. Thus, at the end of the time period $t_{resonant}$, both switches are again closed to begin a new cycle. As shown in FIGS. 2A and 2B, the sum of the time periods $t_{on}$, $t_{hold}$, and $t_{resonat}$ constitute one cycle, so that the frequency of the power converter equals the inverse of the sum of the time periods $t_{on}$, $t_{hold}$, and $t_{resonat}$.

In the preferred embodiment, the voltage at the floating side of the primary winding L1 is greater than the input voltage $V_{cc}$ at the beginning of a cycle. When the first and second switches S1, S2 are closed at the beginning of the period $t_{on}$, current is still flowing from the primary winding L1 toward the first switch S1. As illustrated in FIGS. 2A and 2B, the closure of the switches S1, S2 reduces and eventually reverses this current flow so that the current flowing through the primary winding L1 again ramps up to a peak.

The voltage present across the secondary winding L2 of the transformer T1 is a function of the ratio of turns of the primary and secondary windings. In an actual embodiment, the ratio of turns was 1:20. Those skilled in the art will recognize that a wide range of desired output voltages may be obtained by selecting the appropriate turns ratio between the primary winding L1 and secondary winding L2.

Figure 4:
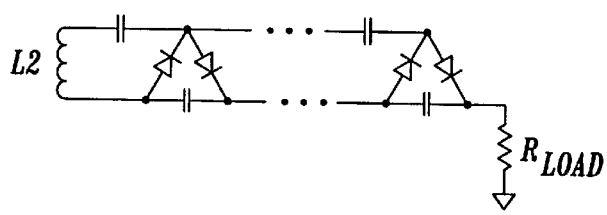
FIG. 4 is a circuit diagram of the multiplier-rectifier circuit of the preferred embodiment.

The voltage present at the secondary winding L2 of the transformer T1 is further multiplied and rectified by a high voltage multiplier-rectifier 20 coupled to the secondary winding L2. With reference to FIG. 4, a series of diodes and capacitors are coupled to the secondary winding L2 of the transformer T1 to form a Cockcroft Walton series voltage multiplier-rectifier that produces the voltage $V_{OUT}$ present at the output of the power converter. In the preferred embodiment, a 12-stage multiplier-rectifier is used to obtain a multiplication of six times the peak-to-peak voltage. Those skilled in the art will recognized that any number, n, of stages may be used in accordance with the present invention. Those skilled in the art will further recognize that any means of voltage multiplication and rectification may be used, consistent with the present invention.

Although the power converter of the present invention uses zero-voltage switching to reduce inefficiencies and noise within the circuit, at least some noise is certain to be present. An input filter 10 is provided in series between the input voltage source $V_{cc}$ and the first switch S1 to reduce or eliminate the noise that remains in the system. As shown in FIG. 1, the filter 10 is indicated as comprising a capacitor C3 and an inductor L3 in combination. Those skilled in the art will recognize that other devices may be used to filter or reduce the effects of noise. In addition, although a single filter stage is depicted in FIG. 1, the filter 10 may include two or more filter stages. Further, additional filters may be provided in other circuit locations.

The voltage $V_{OUT}$ present at the output of the power converter is fed back to the switch controller 30 to control the operation of the first and second switches S1, S2. The switch controller 30 includes a voltage divider 32 coupled to the output voltage signal $V_{OUT}$ to reduce the high voltage signal $V_{OUT}$ to a level nominally equivalent to that of a reference voltage $V_{REF}$. The output from the voltage divider 32 is connected, through a resistor R2, to the negative terminal of an amplifier 35 within an error amplifier circuit 34. The reference voltage signal $V_{REF}$ is connected, through a resistor R3, to the positive terminal of the amplifier 35. A feedback capacitor C5 and resistor R4 are connected in series between the output and the negative input terminal of the amplifier 35. Accordingly, the error amplifier circuit 34 amplifies the magnitude of the difference between the divided output voltage $V_{OUT}$ and the reference voltage $V_{REF}$.

The output of the error amplifier 34 is connected, through a resistor R5, to a first input of the comparator 36. The other input of the comparator is supplied by a ramp generator 70 driven and controlled by a current mode feedback circuit 60, described below, and a synchronization clock 80. Because the output of the synchronization clock 80 is connected as an input to the ramp generator 70, the ramp generator 70 produces a ramp, or "sawtooth," waveform having a frequency equal to that of the synchronization clock 80. The current flowing through the second switch S2 is converted to a voltage by the current mode feedback 60 connected between the second switch S2 and the ramp generator 70. The voltage signal from the current mode feedback 60 is superimposed on the voltage ramp from the ramp generator 70 to produce an averaged peak current mode control. The comparator 36 compares the magnitude of the output of the ramp generator 70 with the output of the error amplifier circuit 34 to generate a square-wave output signal. The duty cycle of the output of the square-wave output of the comparator 36 varies as a function of variations in output load and input line impedances.

At the beginning of a cycle, during the time period designated $t_{on}$, the voltage level of the output of the ramp generator 70 is lower than the output of the error amplifier circuit 34. Accordingly, the output of the comparator 36 is a logic level zero. As soon as the voltage level of the output of the ramp generator 70 rises to a level greater than the output of the error amplifier circuit 34, the output of the comparator switches to a logic level one, corresponding to the beginning of the time period designated $t_{hold}$. When the output of the ramp generator 70 reaches a peak and switches to zero, the output of the comparator 36 again reverts to a logic level zero, corresponding to the beginning of the time period designated $t_{resonant}$.

The output of the comparator 36 is coupled to the switch driver 90. An output from the synchronization clock 80 is also coupled to the switch driver 90. The switch driver 90 is responsive to the synchronization clock 80 and the comparator 36 to drive the first and second switches S1, S1 into the open and closed positions, as appropriate, at the beginning of the time periods for $t_{on}$, $t_{hold}$, and $t_{resonant}$. Accordingly, the first and second switches S1, S2 are closed at the beginning of period $t_{on}$, the first switch is opened at the beginning of period $t_{hold}$, and the second switch is opened at the beginning of period $t_{resonant}$.

In the preferred embodiment, the synchronization clock 80 includes an internal clock 120 configured to produce a clock signal to enable switching at the desired frequency. Those skilled in the art will recognize that additional components may be included to produce the synchronization clock 80, consistent with the present invention. For example, the synchronization clock 80 may include an input for an external synchronization clock 100 and a phase locked loop 110 to enable the synchronization clock 80 to remain synchronized with an external clock. The external synchronization clock input may be particularly useful when it is important that the frequency of the power converter closely match the frequency of the device to which it is supplying power.

Figure 3:
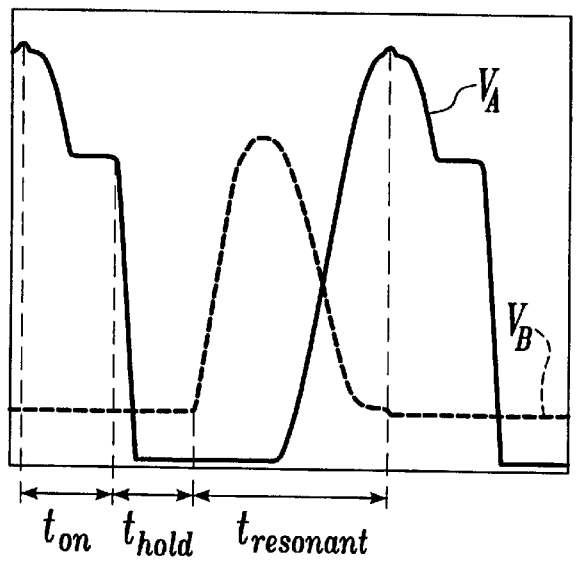
FIG. 3 is a graph of the voltages present at points A and B of the block diagram of FIG. 1, with a load present at the output.

Referring to FIG. 3, the power converter of the present invention maintains a fixed frequency even in the presence of a varying load. While the curves of FIG. 2 were produced with no load present at the output of the power converter, the curves depicted in FIG. 3 were produced with an output load of 1 mA. As was the case for the no-load condition of FIG. 2, each clock cycle in FIG. 3 is divided into time periods $t_{on}$, $t_{hold}$, and $t_{resonant}$. Further, the duration of the time period $t_{resonant}$ is the same under each load condition. Under the load condition of FIG. 3, however, the relative durations of $t_{on}$ and $t_{hold}$ has changed. While the total time for $t_{on}+t_{hold}$ remains the same, $t_{on}$ has increased and $t_{hold}$ has decreased as the load increased. The increased load causes $t_{on}$ to increase because additional energy must be added to the circuit to provide the same desired output voltage to the greater load. The switch controller will therefore cause the first and second switches S1, S2 to remain closed. Once the first switch S1 is opened, however, the synchronization clock 80 will cause $t_{hold}$ to last for a relatively shorter duration so that the time period $t_{resonant}$ is initiated to allow the power converter to maintain a fixed overall frequency. Thus, by "holding" energy for a variable, controllable period of time, the power converter of the present invention is able to delay the start of the circuit resonance to accomplish fixed-frequency switching. At the same time, switching of the first and second switches S1, S2 always occurs when there is zero-voltage across the switches. Accordingly, the power converter of the present invention is able to maintain a fixed overall frequency, even in the presence of changing loads, drift, or other external conditions.

Ideally, the time period thold will be designed to be as short as possible while still enabling fixed-frequency, zero-voltage switching. By designing thold to be short in duration, losses associated with the energy holding are minimized. The circuit according to the present invention would operate most efficiently as the time period $t_{hold}$ approaches zero, such that $t_{hold}$ is only long enough to allow the voltage $V_A$ at the floating side of the primary winding to reset to zero to accomplish zero-voltage switching. Under this maximum efficiency design, the energy holding period would provide fixed-frequency operation only over a very narrow range of line and load impedances. Thus, the minimum $t_{hold}$ design is most useful only when fixed-frequency operation is not required or variable frequency operation is tolerable.

While the preferred embodiment of the invention has been illustrated and described, it will be appreciated that various changes can be made therein without departing from the spirit and scope of the invention. For example, an AC input power source could be used in combination with rectifier circuitry to provide the necessary DC input power source. In addition, a wide variety of switching control means may be used to control the operation of the first and second switches S1, S2. Likewise, although the power converter of the preferred embodiment is designed to convert a 270 volt input source to a 20 kV output, the power converter of the present invention is suitable for other voltage levels, including low voltage applications.

In addition, while the preferred embodiment of the present invention includes a transformer, those skilled in the art will recognize that other inductive devices may be used. Any of a variety of inductive devices, such as inductors or magnetic elements, may be substituted for the transformer. In such cases, a circuit according to the present invention may not have isolation between primary and secondary sides. Similarly, alternate transformers having a center tap or other configurations may be used.

Further, although diodes D1, D2 are used in the preferred embodiment to serve as energy blocking devices, other components may also be used. For example, synchronous rectifiers or MOSFET switches may alternatively be used as devices to block the directional flow of energy.

Still further, while the time period for $t_{resonant}$ is fixed in the preferred embodiment, $t_{resonant}$ could vary, consistent with the present invention. In particular, the components of the power converter may be designed such that the resonation occurs sufficiently within the time period $t_{resonant}$ to allow either $t_{on}$ or $t_{hold}$ to be increased while $t_{resonant}$ is decreased.

Finally, additional switches may be used in conjunction with different transformers or other inductive elements to accomplish the holding of energy prior to circuit resonance.

The power converter of the present invention provides substantial advantages over the power converters of the prior art. By taking advantage of the resonance in the circuit, zero-voltage switching is accomplished, thereby significantly reducing the noise present in the converter. Further, by "holding" energy within the transformer for a variable time period, the overall frequency remains fixed in the presence of variations in input line or output load impedances or other influences.

The embodiments of the invention in which an exclusive property or privilege is claimed are defined as follows:

1. A resonant power converter for changing the magnitude of a voltage source, comprising:
   an inductive device;
   a first switch coupled in series with the voltage source and the inductive device for alternately connecting and disconnecting the voltage source to the inductive device;
   a second switch coupled in series with the inductive device and ground; and
   a switch controller, responsive to a feedback voltage signal and connected to close the first and second switches to add energy during a first portion of a frequency cycle, open the first switch to hold energy within the inductive device during a second portion of the frequency cycle, and open the second switch during a third portion of the frequency cycle to maintain operation of the power converter and switching of the first and second switches under zero-voltage conditions.

2. The power converter of claim 1, wherein the second portion of the frequency cycle is variable in duration to maintain fixed-frequency operation of the power converter.

3. The power converter of claim 2, wherein the inductive device is a transformer having a primary winding and a secondary winding.

4. The power converter of claim 3, further comprising:
   a rectifier coupled to the secondary winding; and
   an output terminal connected to the rectifier.

5. The power converter of claim 3, further comprising:
   a multiplier-rectifier coupled to the secondary winding; and
   an output terminal connected to the rectifier.

6. The power converter of claim 3, wherein the switch controller comprises:
   a reference voltage source;
   a synchronization clock;
   a voltage divider connected to the rectifier and configured to reduce the voltage level present at the rectifier to a level equivalent to the reference voltage level under ideal load conditions;
   an error amplifier configured to amplify the difference between the reference voltage and an output from the voltage divider;
   a ramp generator, responsive to the synchronization clock to produce a ramp waveform;
   a comparator, responsive to the ramp waveform and an output from the error amplifier to produce a square-wave signal having a duty cycle that varies with changes in the output of the error amplifier; and
   a switch driver, responsive to the synchronization clock and the comparator output to control the opening and closing of the first and second switches.

7. The power converter of claim 6, wherein the switch controller is responsive to an external clock to maintain synchronization between the frequency of the external clock and the frequency of the power converter.

8. The power converter of claim 6, further comprising a filter connected between the input voltage source and the first switch.

9. A resonant power converter for changing the magnitude of a voltage source, comprising:
   an inductive device;
   a first switch coupled in series with the voltage source and the inductive device for alternately connecting and disconnecting the voltage source to the inductive device;
   a second switch coupled in series with the primary winding and ground; and
   a switch controlling means, responsive to a feedback voltage signal and connected to close the first and second switches to add energy during a first portion of a frequency cycle, open the first switch to hold energy within the inductive device during a second portion of the frequency cycle, and open the second switch during a third portion of the frequency cycle to maintain operation of the power converter and switching of the first and second switches under zero-voltage conditions.

10. The power converter of claim 8, the second portion of the frequency cycle is variable in duration to maintain fixed-frequency operation of the power converter.

11. The power converter of claim 9, wherein the inductive device is a transformer having a primary winding and a secondary winding.

12. The power converter of claim 11, further comprising:
    a rectifier means coupled to the secondary winding; and
    an output terminal connected to the rectifier.

13. The power converter of claim 11, further comprising:
    a multiplier-rectifier means coupled to the secondary winding; and
    an output terminal connected to the rectifier.

14. The power converter of claim 11, wherein the switch control means comprises:
    a reference voltage source;
    a synchronization clock;
    a voltage divider connected to the rectifier and configured to reduce the voltage level present at the rectifier to a level equivalent to the reference voltage level under ideal load conditions;
    an error amplifier configured to amplify the difference between the reference voltage and an output from the voltage divider to amplify;
    a ramp generator, responsive to the synchronization clock to produce a ramp waveform;
    a comparator, responsive to the ramp waveform and an output from the error amplifier to produce a square-wave signal having a duty cycle that varies with changes in the output of the error amplifier; and
    a switch driver, responsive to the synchronization clock and the comparator output to control the opening and closing of the first and second switches.

15. The power converter of claim 14, wherein the switch control means is responsive to the external clock to maintain synchronization between the frequency of the external clock and the switching frequency of the power converter.

16. The power converter of claim 14, further comprising a filter connected between the input voltage source and the first switch.

17. A method for generating a DC voltage output, using a resonant circuit including at least one switch coupled in series with a voltage source and an inductive device, comprising the steps of:

adding energy to the circuit from the voltage source during a first portion of a clock cycle while the switch is closed;

holding energy within the circuit to delay resonation during a second portion of the clock cycle while the switch is opened;

allowing the energy within the circuit to resonate during a third portion of the clock cycle; and closing the switch while there is substantially zero voltage across the switch to begin a new clock cycle.

18. The method of claim 17, wherein the durations of the first and second portions of the clock cycle are variable to maintain a substantially fixed clock cycle.

19. The method of claim 18, further comprising the step of rectifying an output signal to produce a DC voltage output.

20. The method of claim 19, further comprising the step of filtering the input voltage source.

\* \* \* \* \*